Nov. 21, 1933.    W. L. SPALDING    1,935,675
PREPARATION OF HYDROGEN
Filed June 24, 1930
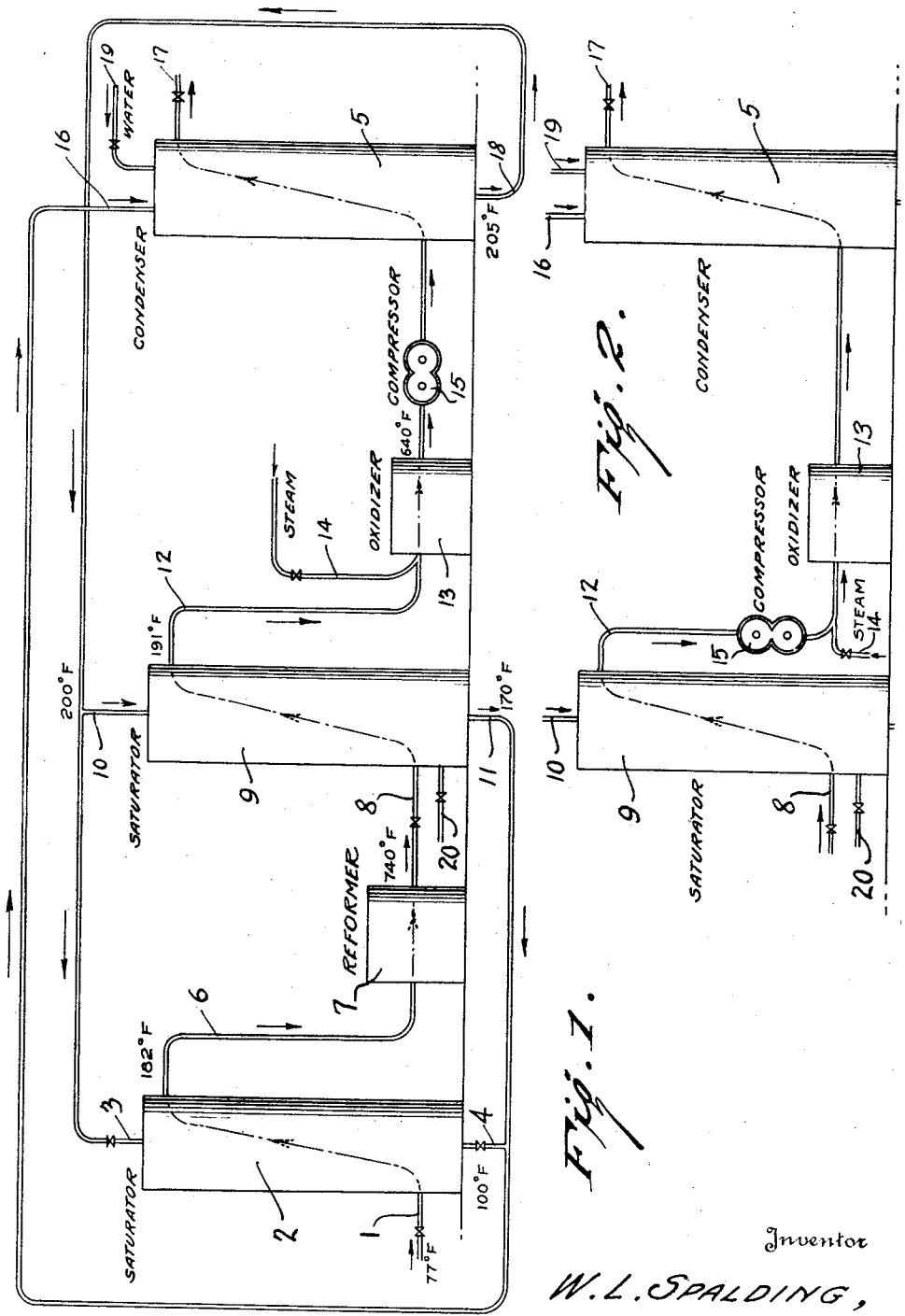
Inventor
W. L. SPALDING,
By
Attorney Patented Nov. 21, 1933

1,935,675

UNITED STATES PATENT OFFICE 1,935,675

PREPARATION OF HYDROGEN

William L. Spalding, Westfield, N. J., assignor to American Cyanamid Company, New York, N. Y., a corporation of Maine Application June 24, 1930. Serial No. 463,504

11 Claims. (Cl. 23—212)

My present invention relates to the synthesis of ammonia and is particularly concerned with that step in the process which includes the generation of hydrogen by reacting a gas containing carbon monoxide with water vapor. The hydrogen thus generated may be used for any desired purpose, one of which is for the synthesis of ammonia with nitrogen from the air or other source.

The gases used for generating hydrogen by this process commonly include water gas, producer gas, cracked natural gas or other gases containing carbon monoxide with or without hydrogen. The gas is mixed with water vapor and caused to react in an oxidizer containing a catalyst at a high temperature, according to the equation—

$$CO + H_2O = CO_2 + H_2$$

This reaction never goes to completion, but can be assisted by an excess of water vapor. It is common practice to use a large excess of water vapor, some of which remains in the gas when it leaves the oxidizer.

It is common practice to supply this water vapor partly as exhaust steam and partly by condensation and re-evaporation of the excess vapor, the latter being usually carried out in two towers. The first tower, called the saturator, is fed with hot water, and the second, called the condenser, is fed with cold water. The unoxidized gas ascends the first, becomes heated and saturated with water vapor, the quantity of which depends upon the temperature of the hot water used. After oxidation the gas ascends the second tower and becomes cooled, thereby condensing some of its vapor content.

The economy of the above method lies in the fact that the hot water needed in the first tower is obtained from the discharge of the second tower in which the water is heated by condensation, and that the cold water needed for the second tower can be obtained from the discharge of the first, in which the entering water is cooled by evaporation. A circulation of water is thus maintained by two pumps, which interchange water between two towers.

Most of the heat in the water vapor in the condenser could be recovered if sufficient water were used, but unfortunately in common practice this water would be at too low a temperature to heat the gas in the first tower to a degree where it contains the desired quantity of water vapor.

Although the gases entering the second tower may far exceed the temperature desired in the hot water, yet the water cannot be heated above the wet bulb temperature of the gas on account of a cooling effect caused by the rapid evaporation of the water on contact with the gas. In addition, the gas leaving the condenser will contain considerable uncondensed vapor, and the gas leaving the saturator will not quite attain the temperature of the entering hot water. These practical limitations normally prevent the recovery of more than about one-third of the total vapor required in the oxidizer.

My invention proposes to increase this recovery by a method which increases the temperature of the water leaving the condenser and the wet bulb temperature of the oxidized gas. It consists of imposing a pressure in the condenser. This may be effected by a compressor which increases the pressure of the entering gas to any economical point, for example, 5 or 10 lbs. per square inch above the pressure of the gas in the saturator.

An important advantage of this present method resides in the fact that the vapor content of the gas leaving the condenser is less than would be the case if it left at the same temperature but under atmospheric pressure. By means of my invention, the amount of water vapor obtained from the circulation system is considerably increased, even to the extent that no extraneous supply of steam may be required.

A further economy, occurring when natural gas is reformed to produce a mixture of carbon monoxide and hydrogen, arises from the use of a second saturating tower located before the reformer. It is common practice to add some steam to the gas previously to reforming to increase the amount of hydrogen which can be obtained from the reformer, and this water vapor can be economically obtained from hot water circulated from the condenser through a second saturator, in a manner similar to that described above.

The invention further consists in the novel arrangements of construction and combination of parts more fully shown and described hereinafter.

In the drawing:

Fig. 1 is a diagrammatical layout embodying the invention as applied to natural gas, and includes a saturator both for the unreformed and the reformed gas, in which the compressor is located between the oxidizer and the condenser, and Fig. 2 is a diagrammatical layout which embodies a modification showing the compressor located between the saturator and the oxidizer.

Referring now with particularity to the embodiment illustrated in Fig. 1, and assuming the material initially treated to be natural gas, the latter enters the valved inlet 1 of the saturator 2, passing through the same counter-current to a flow of water entering at 3, which passes out of the bottom of the saturator as at 4. In ordinary operations, a satisfactory temperature for the in-coming natural gas may be approximately 77° F. The water entering the top of the saturator 2 will be approximately 200° F., this high temperature existing by reason of the fact that this water is supplied from the bottom of the condenser 5 operated under pressure, all as will be more fully described hereinafter. The temperature of the saturator water leaving through the pipe 4 will be substantially 100° F.

The partially or completely water-saturated natural gas leaves the top of the saturator through the pipe 6 at a temperature of substantially 182° F. and enters the reforming apparatus 7, which may be of any desired design, for the decomposition of the natural gas according to the following reaction:—

$$CH_4 + H_2O = CO + 3H_2$$

The thus generated hydrogen and carbon monoxide leaves the reformer and auxiliary equipment, which is a regenerative checkerwork by which heat is applied and the necessary reaction temperatures obtained, through the pipe 8 at a temperature in the neighborhood of 740° F. and passes through a second saturator 9 counter-current to a flow of water. This is for the purpose of adding additional water vapor as required for oxidation. The water for the saturator 9 enters through the pipe 10 at substantially a temperature of 200° F. and passes out of the bottom thereof through the pipe 11 at approximately 170° F.

The partially or completely saturated gas is removed from the top of the saturator 9 through the pipe 12, being at that point at a temperature of substantially 191° F., from which it enters the oxidizing apparatus 13. At this point it may be desirable, if the gas is not already saturated with the sufficient number of water vapor units, to add water vapor as steam. This may be done through the valved line 14, although it is to be understood that this may not be necessary.

The oxidizing apparatus may be of any desired type and it has been found that a catalyst containing iron oxide is satisfactory for this purpose, all of which is well-known in the art. Within the oxidizer 13 the following reaction takes place:—

$$CO + H_2O = CO_2 + H_2$$

The gas leaves the oxidizer and heat exchanger 13 at substantially a temperature of 640° F.

From this point the gas passes to a compresser 15 where the same is put under a pressure of, in this instance, 5 lbs. per square inch above atmospheric, and delivered to the bottom of the condenser 5. The gas passes upwardly through the condenser 5 counter-current to a flow of water entering at 16 and is removed therefrom through the pipe 17 to any desired apparatus. The condenser water flows out of the condenser through the pipe 18 at substantialy a temperature of 205° F., from which it passes to the pipes 10 and 3 of the saturators 9 and 2 respectively. The water entering the condenser 5 through the pipe 16 is supplied from the exit pipes 4 and 11 of the saturators.

Due to the pressure under which the condenser 5 is operated, the wet bulb temperature of the gas therein is materially raised, which, therefore, causes the water to acquire a higher temperature. At the same time the pressure decreases the water content of the gases, leaving the condenser, and therefore permits a more efficient condensation thereof in that portion of the apparatus. As a result thereof, the water passing from the condenser is at a higher temperature than is true in carrying out the process in the ordinary way, and this hotter water entering the saturators permits more efficient saturation there.

From the outlet 17, the substantially water-freed gases may be passed through a pressure storage receiver and purification process to the ammonia synthesizing apparatus.

The above temperature figures have been given as an example in which the condenser was being operated under a pressure of substantially 5 lbs. If a 10 lb. operating pressure is used, the condensing water leaves through the pipe 18 at a temperature of about 216° F. and enters the top of the saturators 2 and 9 at a temperature of substantially 212 F°. Thus, there is both an increased evaporation in the saturators 2 and 9, and also an increased condensation in the condenser. In both instances, any loss of water from the system may be compensated for by additions from the pipe 19.

The above description has assumed that it was desirable to use natural gas as the initial material, but where other gases containing carbon monoxide are used, this gas may be supplied directly to the saturator 9 through the pipe 20 from which point the operation continues as above described, except that the temperatures and water content of the gases will be different due to the fact that the gas enters the saturator at a lower temperature and may require more or less water vapor for its oxidation.

In some instances it has been found that it is possible and even desirable to operate the oxidizing apparatus 13 under pressure. Where this has been found desirable or expedient, the compresser may be moved from the position shown in Fig. 1 to that shown in Fig. 2, to wit, between the saturator 9 and the oxidizer 13. With this exception, the operation is carried out as above described.

As an illustration of the saving in steam additions to supply the necessary water vapor accomplished by the above set-up as against that required in the prior processes, in which the condenser is not operated under a pressure, it may be stated that the latter case normally requires for reforming and oxidizing natural gas, from 7,000 to 8,000 lbs. of additional steam to be supplied per ton of ammonia produced. By operating the set-up under a pressure of 5 lbs. per square inch, only 2,400 lbs. of steam are required per ton of ammonia produced, and when operating at 10 lbs. pressure, 910 lbs. of steam per ton of ammonia produced. It will thus be seen that a material saving in the cost of operation may be secured by the invention herein shown and described.

If the temperature of the gas from the oxidizer 13 is excessive for the compresser 15 in the set-up of Fig. 1, this temperature may be reduced by passing the gas through a boiler or other form of heat exchanger, or by spraying enough water into it to nearly saturate the gas, this water being entirely evaporated.

It is to be noted that a vacuum on the saturators 2 and 9 may be substituted for the proposed pressure on the condenser, as the invention depends upon a differential pressure between the saturator and condenser and not upon the actual pressure in either.

It is to be understood that the temperatures and quantities mentioned are for the purpose of explaining the principles involved and will be different with other conditions, for example, a gas of a different composition, a longer or shorter time of contact of gas and water in the towers, etc. Moreover, the temperatures of the gases leaving the reformer are not indicative of the actual reaction temperatures therein. Also, the optimum pressure to be used in the condenser will depend upon many factors, including the cost of power for compression, the quantities of waste steam available from other processes, etc.

While the invention has been shown and described with particular reference to an apparatus and method for the synthesis of ammonia, which includes the generation of hydrogen, yet obviously the invention is not to be limited thereto as the herein described set-up, which includes a saturator and a condenser operated under differential pressure, may be expeditiously used with many gases to cause efficient saturation with water vapor for any desired purpose, and hence the invention is to be construed broadly and limited only by the scope of the claims.

I claim:

1. In a process of producing hydrogen-containing gases including the steps of saturating carbon monoxide gases with water vapor, adding steam if necessary, reacting to produce carbon dioxide and hydrogen, and condensing water from the reacted gases, the improvement which comprises compressing the gases after saturation and passing them to the condensing step at a higher relative gas pressure than that of the saturating step, passing the condensate so obtained to the saturating step and passing excess water from the saturating step to the condensing step.

2. In a process of producing hydrogen-containing gases including the steps of saturating carbon monoxide gases with water vapor, adding steam if necessary, reacting to produce carbon dioxide and hydrogen, and condensing water from the reacted gases, the improvement which comprises compressing the gases and passing to the condensing step at a pressure approximately five pounds per square inch higher than that of the saturating step, passing the condensate so obtained to the saturating step and passing excess water from the saturating step to the condensing step.

3. In a process of producing hydrogen-containing gases including the steps of saturating carbon monoxide gases with water vapor, adding steam if necessary, reacting to produce carbon dioxide and hydrogen, and condensing water from the reacted gases, the improvement which comprises compressing the gases after saturation and passing them to the condensing step at a pressure approximately ten pounds per square inch higher than that of the saturating step, passing the condensate so obtained to the saturating step, and passing excess water from the saturating step to the condensing step.

4. A process of preparing hydrogen containing gases which comprises saturating natural gas by passing it through a saturator counter-current to a flow of heated water, reforming the gas from the saturator, further saturating the gaseous products of the reforming step by passing them through a second saturator counter-current to a flow of heated water, then reacting the gas in an oxidizer to produce carbon dioxide, then removing water vapor by passing the resultant gas through a condenser counter-current to a flow of water, maintaining the condenser under pressure, returning the water from the saturators to the top of the condenser and the water from the condenser to the top of the saturators.

5. A process of preparing hydrogen containing gases which comprises saturating natural gas by passing it through a saturator counter-current to a flow of heated water, reforming the gas from the saturator, further saturating the gaseous products of the reforming step by passing them through a second saturator counter-current to a flow of heated water, then reacting the gas in an oxidizer to produce carbon dioxide, then removing water vapor by passing the resultant gas through a condenser counter-current to a flow of water, maintaining the condenser at substantially 5 lbs. pressure per sq. in., returning the water from the saturators to the top of the condenser and the water from the condenser to the top of the saturators.

6. A process of preparing hydrogen containing gases which comprises saturating natural gas by passing it through a saturator counter-current to a flow of heated water, reforming the gas from the saturator, further saturating the gaseous products of the reforming step by passing them through a second saturator counter-current to a flow of heated water, then reacting the gas in an oxidizer to produce carbon dioxide, then removing water vapor by passing the resultant gas through a condenser counter-current to a flow of water maintaining the condenser at substantially 10 lbs. pressure per sq. in., returning the water from the saturators to the top of the condenser and the water from the condenser to the top of the saturators.

7. A process of preparing hydrogen containing gases which comprises saturating natural gas by passing it through a saturator counter-current to a flow of heated water, reforming the gas from the saturator to produce carbon monoxide, further saturating the gaseous products of the reforming step by passing them through a second saturator counter-current to a flow of heated water, adding to the gas a sufficient amount of steam which, with the moisture taken up in the saturators, will react with substantially all the carbon monoxide to produce carbon dioxide and hydrogen, passing the mixture of gas and steam through an oxidizer under conditions operative to bring about said reaction, removing water vapor by passing the resultant gas through a condenser counter-current to a flow of water, maintaining the condenser under pressure, returning the water from the saturators to the top of the condenser and the water from the condenser to the top of the saturators.

8. A process of preparing hydrogen containing gases which comprises saturating natural gas by passing it through a saturator counter-current to a flow of heated water, reforming the gas from the saturator to produce carbon monoxide, further saturating the gaseous products of the reforming step by passing them through a second saturator countercurrent to a flow of heated water, adding to the gas a sufficient amount of steam which, with the moisture taken up in the saturators, will react with substantially all the carbon monoxide to produce carbon dioxide and hydrogen, passing the mixture of gas and steam through an oxidizer under conditions operative to bring about said reaction, removing water vapor by passing the resultant gas through a condenser counter-current to a flow of water, maintaining the condenser at substantially 5 lbs. pressure, returning the water from the saturators to the top of the condenser and the water from the condenser to the top of the saturators.

9. A process of preparing hydrogen containing gases which comprises saturating natural gas by passing it through a saturator counter-current to a flow of heated water reforming the gas from the saturator to produce carbon monoxide, further saturating the gaseous products of the reforming step by passing them through a second saturator counter-current to a flow of heated water, adding to the gas a sufficient amount of steam which, with the moisture taken up in the saturators, will react with substantially all the carbon monoxide to produce carbon dioxide and hydrogen, passing the mixture of gas and steam through an oxidizer under conditions operative to bring about said reaction, removing water vapor by passing the resultant gas through a condenser counter-current to a flow of water, maintaining the condenser at substantially 10 lbs. pressure, returning the water from the saturators to the top of the condenser and the water from the condenser to the top of the saturators.

10. A process of preparing hydrogen containing gases which comprises saturating natural gas by passing it through a saturator counter-current to a flow of heated water, reforming the gas from the saturator to produce carbon monoxide, further saturating gaseous products of the reforming step by passing them through a second saturator counter-current to a flow of heated water, adding to the gas a sufficient amount of steam which, with the moisture taken up in the saturators, will react with substantially all the carbon monoxide to produce carbon dioxide and hydrogen, passing the mixture of gas and steam through an oxidizer under conditions operative to bring about said reaction, compressing the resultant gas, removing water vapor by passing the compressed gas through a condenser counter-current to a flow of water, returning the water from the saturators to the top of the condenser and the water from the condenser to the top of the saturators.

11. A process of preparing hydrogen containing gases which comprises saturating natural gas by passing it through a saturator counter-current to a flow of heated water, reforming the gas from the saturator to produce carbon monoxide, further saturating the gaseous products of the reforming step by passing them through a second saturator counter-current to a flow of heated water, adding to the gas a sufficient amount of steam which, with the moisture taken up in the saturators, will react with substantially all the carbon monoxide to produce carbon dioxide and hydrogen, compressing the mixture, passing the compressed mixture to an oxidizer under conditions operative to bring about said reaction, removing water vapor by passing the compressed gaseous products of the reaction through a condenser counter-current to a flow of water, returning the water from the saturators to the top of the condenser and the water from the condenser to the top of the saturators.

WILLIAM L. SPALDING.